Patented Dec. 12, 1950

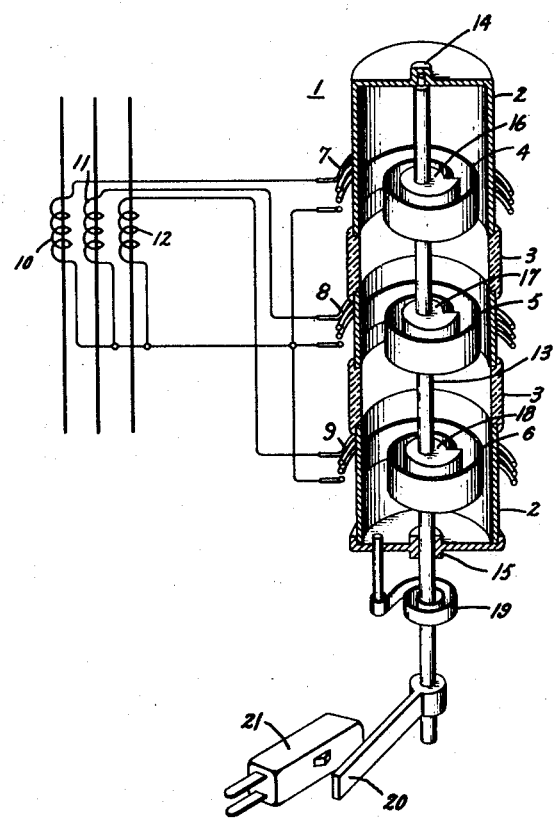

2,534,103

UNITED STATES PATENT OFFICE 2,534,103

THREE-PHASE BIMETAL THERMAL RELAY

Guglielmo Camilli, Pittsfield, Mass., assignor to General Electric Company, a corporation of New York Application September 24, 1949, Serial No. 117,694

2 Claims. (Cl. 200—122)

This invention relates to electric relay systems, and more particularly to a three-phase bimetal thermal relay.

In the operation of three-phase electrical systems, it is common practice to have relaying devices which are responsive to the current conditions in each of the three phases of the system, so that an overcurrrent in any one or all of the phases will cause an appropriate cutout to function.

It is an object of this invention to provide an electrical relay for use in a three-phase electrical system so constructed that the same relay mechanism is responsive to the conditions in all three phases, rather than using a separate relay device for each phase.

It is a further object of this invention to provide an electrical relay for a three-phase system which is structurally compact and simple in operation.

It is a still further object of this invention to provide a three-phase electrical relay which is independently responsive to current conditions in each of the three phases, so that an overload condition in any of the three phases will cause operation of the relay.

In accomplishment of these objectives, this invention provides a three-phase electrical relay having three bimetallic elements mounted inside of a suitable container, with each bimetallic element being responsive to a heating element in one of the three phases of the system being controlled. The three bimetallic elements are mounted concentrically of a center shaft, in such manner that motion of any one of the bimetallic elements causes motion of the shaft, which, in turn, may actuate any suitable switching device.

The features of this invention which I believe to be novel are set forth with particularity in the appended claims. My invention itself, however, both as to its organization and use, together with further objects and advantages thereof, may best be understood by reference to the following description taken in connection with the accompanying drawing in which the single figure shows a view in front elevation of a relay constructed in accordance with my invention.

Referring now to thed rawing, there is shown a relay casing or envelope 1 of cylindrical shape, constructed of alternate metal and non-metal sections 2 and 3, respectively. Spirally-wound bimetal elements 4, 5, and 6 are respectively attached at one end to the interior of each of the metal casing sections 2. On the exterior of the casing 1, and mounted in such a way as to respectively surround the three metal casing sections 2 and bimetal elements 4, 5, and 6, are three heating elements 7, 8, and 9 which are respectively energized by current transformers 10, 11, and 12, in each of the phases of a three-phase electrical system.

Axially-mounted within the cylindrical casing 1 is a shaft 13, suitably supported by bearings 14 and 15 at either end of the cylindrical casing. Rigidly mounted on the center shaft 13 are three abutments 16, 17, and 18, which are respectively surrounded by the spiral bimetallic elements 4, 5, and 6. When conditions are normal in all phases, each of the abutments bears against the free end of its associated spiral bimetallic element.

The bimetallic elements 4, 5, and 6 are constructed with the radially outer layer of the bimetallic element being made of a metal having a higher coefficient of thermal expansion than the radially inner layer of the bimetallic element. Consequently, heat will cause the bimetallic element to expand in a clockwise direction, with respect to the view shown in the drawing.

The shaft 13 is biased in a counterclockwise direction by means of a light spring 19, which serves only to keep the shaft and its associated abutments lightly bearing against the bimetallic elements.

Due to the interposition of the non-metal sections 3, which may be made of glass or plastic, each bimetallic element is heated only by its respective associated heating element, with the heat being transferred from the heating element through the metal casing section 2. Heat flow from one section to another is prevented by the glass or plastic insert sections 3.

If any one of the phases of the three-phase system becomes overloaded, it will cause a proportionate increase in the heat given off by its associated heating element. This, in turn, causes the associated bimetallic element to move in a clockwise direction against its corresponding abutment 16, 17, or 18, thereby rotating shaft 13. If the current in the other two phases is normal at the time of the overload in one phase, the bimetallic elements associated with the phases having normal current are not affected and lag behind the bimetallic element of the overloaded phase. However, the motion of any one of the bimetallic elements causes rotation of the shaft 13. When the current is normal in all phases, the position of the cam shaft is such that the switch lever 20 which is attached to shaft 13 is in an unactuated position. An overload current in any one phase causes motion of the corresponding bimetal which is sufficiently large to move shaft 13 the necessary distance to actuate switch 21.

Thus it can be seen that I have provided a unitary relay structure with an independent operating device for each of the phases of a three-phase system. An abnormal condition in any one of the phases will actuate the relay-controlled switch independently of the condition of the other phases.

While there has been shown and described a particular embodiment of my invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. A switching device for a three-phase electrical system comprising a cylindrical casing having metallic and non-metallic cylindrical casing sections alternating axially of said casing, three heating elements each respectively responsive to the current in one phase of said three-phase system and each respectively positioned adjacent to one of said metal casing sections, a spiral bimetallic element associated with each of said heating elements positioned inside each of said metal casing sections and having one end attached thereto and one end free to move, a rotatable shaft axially mounted within said cylindrical casing, said spiral bimetallic elements being concentrically arranged about said shaft but axially displaced from one another along said shaft, said shaft being provided with a separate abutment adjacent each of said spiral bimetallic elements, said abutments being rotatable with said shaft, each of said spiral bimetallic elements having its free end abutting against an edge of its respective abutment on said shaft so that motion of any one of said bimetallic elements causes motion of said shaft, and switching means actuated by a predetermined movement of said shaft.

2. A switching device for a three-phase electrical system comprising a casing having metal and non-metal wall sections alternating axially of said casing, three heating elements each respectively responsive to the current in one phase of said three-phase system, one of said heating elements being concentrically mounted about the exterior surface of each of said metal wall sections, a separate bimetallic element responsive to each of said heating elements and positioned inside of each of said metal wall sections, each of said bimetallic elements being spirally wound and having one end rigidly attached to the interior surface of its respective metal wall section and one end free to move, a rotatable shaft axially mounted within said casing and axially of said spiral bimetallic elements, said shaft being provided with a separate abutment adjacent each of said spiral bimetallic elements, said abutments being rotatable with said shaft, each of said spiral bimetallic elements having its free end abutting against an edge of its respective abutment on said shaft so that motion of any one of said bimetallic elements causes motion of said shaft, and switching means actuated by a predetermined movement of said shaft.

GUGLIELMO CAMILLI.

REFERENCES CITED

The following references are of record in the file of this patent:

UNITED STATES PATENTS

| Number | Name | Date |
|---|---|---|
| 2,099,568 | Metzger | Nov. 16, 1937 |
| 2,284,383 | Elmer | May 26, 1942 |

FOREIGN PATENTS

| Number | Country | Date |
|---|---|---|
| 486,710 | Germany | Nov. 28, 1929 |
| 673,598 | Germany | Mar. 24, 1939 |